(12) United States Patent
Aono et al.

(10) Patent No.: US 6,907,341 B2
(45) Date of Patent: Jun. 14, 2005

(54) MISFIRE DETECTOR

(75) Inventors: Toshihiro Aono, Abiko (JP); Eisaku Fukuchi, Hitachi (JP); Toshio Hori, Hitachinaka (JP); Yutaka Takaku, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/676,014

(22) Filed: Oct. 2, 2003

(65) Prior Publication Data

US 2004/0122585 A1 Jun. 24, 2004

(30) Foreign Application Priority Data

Oct. 2, 2002 (JP) .................................... 2002-289358

(51) Int. Cl.$^7$ .............................................. G06G 7/70
(52) U.S. Cl. ................. 701/111; 701/114; 123/406.14; 123/406.16; 123/406.24; 123/406.27; 123/406.29; 123/406.37; 123/406.58
(58) Field of Search ................................ 701/111, 114; 123/406.14, 406.16, 406.24, 406.27, 406.26, 406.29, 406.34, 406.37, 406.58, 406.62

(56) References Cited

U.S. PATENT DOCUMENTS 6,006,155 A * 12/1999 Wu et al. .................... 701/111
6,292,738 B1 * 9/2001 Feldkamp et al. ........... 701/106
6,546,328 B1 * 4/2003 Slicker ....................... 701/111

FOREIGN PATENT DOCUMENTS

JP         07-119536        5/1995

* cited by examiner

*Primary Examiner*—Tony M. Argenbright
*Assistant Examiner*—Johnny H. Hoang
(74) *Attorney, Agent, or Firm*—Antonelli, Terry, Stout & Kraus, LLP

(57) ABSTRACT

A misfire detector is provided that is accurate even in the case of a disturbance due to causes such as driving on a rough road. The misfire detector is equipped with a crankshaft revolution detector to measure the time period required for the crankshaft of an internal-combustion engine to revolve for a given angle. A signal-processor is also provided for detecting the misfiring of the internal-combustion engine by processing the time period. In one embodiment, the misfire detector has two filters having the same sensitivity to the misfire frequency, and differing in the sensitivity to frequencies adjacent to said misfire frequency. It can be determined that a misfire has occurred if the ratio or difference between the outputs of the two filters stays within a fixed range and one or both of the filters have respective outputs exceeding a threshold value.

10 Claims, 10 Drawing Sheets

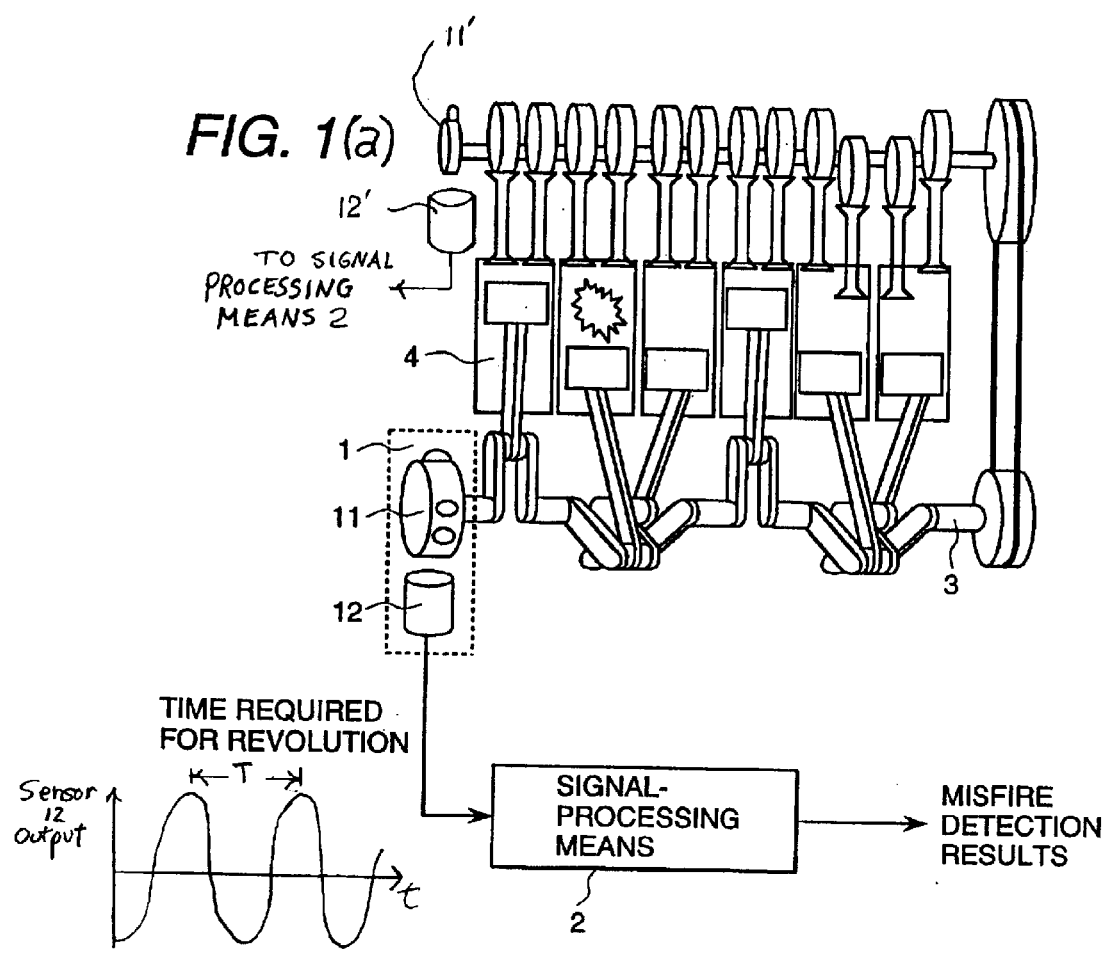
FIG. 1(a)
FIG. 1(b)
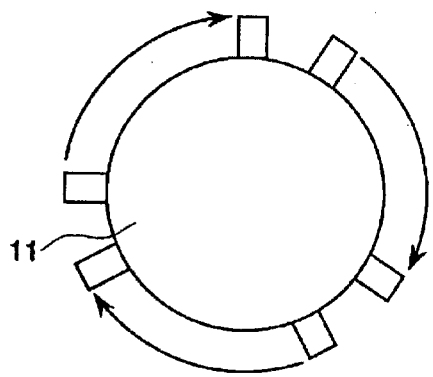
FIG. 2(a)
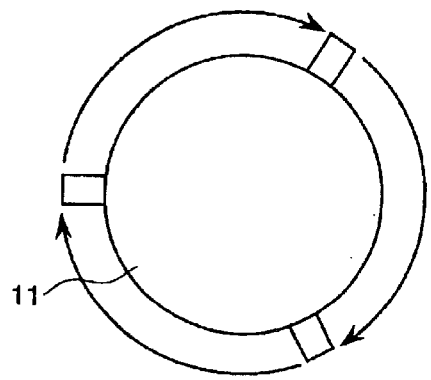
FIG. 2(b)

MISFIRE DETECTOR

BACKGROUND OF THE INVENTION

The present invention relates to an apparatus that can accurately detect misfires in a multi-cylinder internal-combustion engine, and more particularly, to an apparatus that can accurately count the number of misfires for each cylinder even if a vehicle equipped with the engine runs on rough roads and even if the vehicle body experiences jolting (which can actually occur as a result of a misfire or from some other cause).

A conventional combustion status detector used in an internal-combustion engine can be equipped with a revolving speed detection device for detecting the revolving speeds of the internal-combustion engine for each of the required revolving angle periods of its crankshaft that are shorter than the ignition period of the engine. An averaging device can also be provided for averaging the detected engine speeds by a period equivalent to one revolution of the crankshaft, thereby permitting detection of the combustion status of the engine. For example, the speed can be averaged for one minute to determine the combustion status of the engine, which, in turn, can be used to determine the combustion condition. In conjunction with this, a misfire detection capability can be realized based on the combustion status detector. The misfire detection device can include a deviation calculation device for calculating the deviation between the average value engine speed calculated by the averaging means and the average value calculated during the time from the calculation of the calculated average engine speed to the required ignition period. A deviation averaging device is also included for averaging the foregoing deviation on the basis of a period equivalent to the foregoing ignition period. Also, a combustion status detection device is provided for detecting the combustion status of the engine on the basis of the foregoing averaged deviation. Such an arrangement is described, for example, on Page 2 of Japanese Application Patent Laid-Open Publication No. Hei 07-119536 (hereinafter referred to as Reference 1)

In Reference 1 noted above, a sufficiently accurate misfire detector has been achievable under ordinary driving conditions because the filter used in this application can extract primarily the frequency components of the misfire and effectively cut off the components of adjacent higher and lower frequencies. In the arrangement discussed in Reference 1, a four-cylinder internal-combustion engine is dealt with as an example. However, if the number of internal-combustion engine cylinders is larger than four, the revolving angle of the crankshaft for one explosion stroke becomes smaller. This can lead to a deterioration in the detection accuracy of the time required for one explosion stroke. As a result of this deterioration, it is not possible to realize a filter with sufficient frequency characteristics to accurately realize detection of a misfire. The accurate detection of a misfire becomes even more of a problem when the vehicle travels over rough roads, as will be discussed below.

Typically, in a revolving speed detector such as discussed above, a magnetic sensor changes its output according to the distance between the sensor and the teeth of the ring gear. This change in output can be plotted as a wave form having recurring peaks, each peak being indicative of one explosion stroke, as shown in FIG. 1(b). A time period T between the recurring peaks indicates the time required for one explosion stroke, and this time period can be monitored to determine the combustion status.

Specifically, when no misfire occurs, the time period T is uniform. However, when a misfire occurs, the time period T changes because the misfire decreases the rotation speed, thereby the time interval T increases. Normally, this change in time period can be detected by a filter which indicates a misfire. However, if a vehicle is traveling on a rough road, or if the vehicle experiences jolting for some other reason, including an after effect of a misfire, the period T changes similarly to that created by a misfire. Accordingly, prior art systems often inaccurately diagnosed a misfire even when no such misfire existed. This problem becomes even more likely in the case of a six or more cylinder engine (as opposed to a four cylinder engine) because of the deterioration of the revolution detector accuracy, as noted above.

An object of the present invention is to realize a misfire detector that accurately detects misfires even in cases where the vehicle is driven over a rough road surface and or in situation involving noise such as jolts of the vehicle body, by using two filters to extract the intended frequency components more effectively.

SUMMARY OF THE INVENTION

The above object is achieved by a misfire detector including a revolution detection means for measuring the time period required for the crankshaft of an internal-combustion engine to revolve for a given angle, and a signal-processing means for detecting the misfiring of the internal-combustion engine by processing the time period generated by the revolution detection means. In one embodiment signal-processing means includes two filters having the same sensitivity with respect to the frequency resulting from misfiring, and differing in the sensitivity with respect to frequencies adjacent to this misfire frequency. A judgment means is also provided to determine that a misfire has occurred if the ratio or difference between the outputs of the two filters stays within a given range and one or both of the two filters have the respective outputs exceeding a threshold.

The above object can also be achieved by a misfire detector having a revolution detection means for measuring the time period required for the crankshaft of an internal-combustion engine to revolve for a given angle, and a signal-processing means for detecting the misfiring of the internal-combustion engine by processing the time period from the revolution detecting means. The signal-processing means includes a filter whose sensitivity with respect to the frequency components resulting from misfiring is 0 and whose sensitivity with respect to frequencies adjacent to the corresponding frequency is not 0. Another filter is also provided which has a maximum sensitivity with respect to the frequency components of the misfire. A judgment means is also provided to determine that a misfire has occurred when the output of the former filter stays within a given range and the output of the latter filter exceeds a threshold value.

Alternatively, the above object can be achieved by a misfire detector having a revolution detection means for measuring the time period required for the crankshaft of an internal-combustion engine to revolve for a given angle, and a signal-processing means for detecting the misfire of the internal-combustion engine by processing the time period from the revolution detection means. The signal-processing means comprises a filter which outputs the index indicating the difference between the frequency of he input signal and the frequency of a misfire, a filter which outputs the amplitude of its input signal, and or a judgment means to decide that a misfire has occurred when the output of the former filter stays within a given range and the output of the latter filter exceeds a threshold.

In the misfire detector outlined above, the signal-processing means can have an output memory to store past outputs of either of the two filters, a comparison means for comparing the values of data size which have been stored into said output memory, and a misfiring-cylinder identification means. For example, when the filter output exceeds the threshold, the misfiring cylinder identification means can determine that the misfired cylinder was the cylinder fired three combustion cycles prior to the current cylinder in the combustion cycle.

BRIEF DESCRIPTION OF THE DRAWINGS

FIG. 1(a) is a block diagram of the misfire detector pertaining to an embodiment of the present invention.

FIG. 1(b) shows a wave form of crankshaft revolution determined from the sensor 12 of FIG. 1.

FIGS. 2(a) and 2(b) show an example of the shapes of ring gears.

DETAILED DESCRIPTION OF THE INVENTION

First Embodiment

Figure 3:
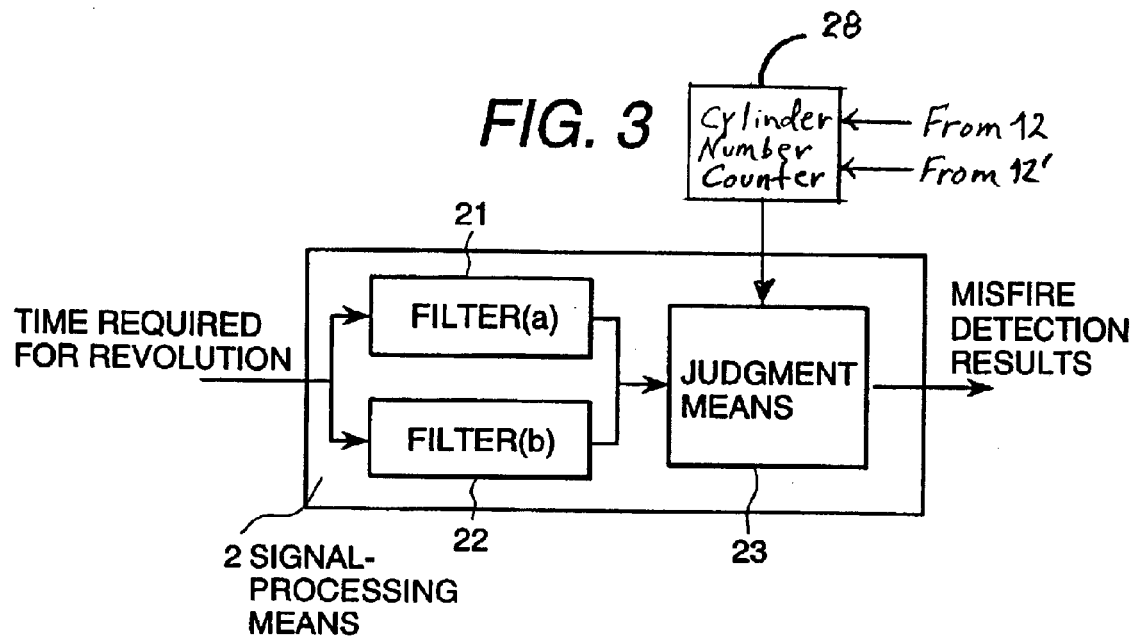
FIG. 3 is a block diagram of the signal-processing means pertaining to an embodiment of the present invention.

FIG. 1 is a diagram showing an example of a construction based on the present invention. A first embodiment of the invention is described below using this figure.

The misfire detector of the first embodiment can be broadly divided into two parts: a revolution detection means 1 for measuring the time period required for the crankshaft of an internal-combustion engine to revolve for a given angle; and a signal-processing means 2 for detecting the misfiring of the internal-combustion engine by processing the time period determined by the revolution detection means.

The revolution detection means 1 includes a ring gear 11 and a magnetic sensor 12. The ring gear 11 has teeth such as shown in FIG. 2(a). The output of the magnetic sensor 12 changes in accordance with the distance between the magnetic sensor and the teeth of the ring gear 11. Therefore, the time period, that is to say, the time period required for crankshaft revolution for a given angle, can be measured by measuring the time intervals of change in the output of the magnetic sensor 12.

FIGS. 2(a) and 2(b) show ring gears 11 which are suitable for a six-cylinder internal-combustion engine. In the case of a six-cylinder internal-combustion engine, since three cylinders undergo an explosion (or expansion) stroke during one revolution of the crankshaft, the tooth-to-tooth interval of ring gears 11, which are each denoted by an arrow-marked arc in FIGS. 2(a) and (b) can be regarded as the angles through which the ring gears 11 revolve while one cylinder undergoes an expansion stroke. FIG. 2(b) particularly shows a case where only three teeth are utilized. This arrangement works well at high speeds and is based essentially on ignoring three of the additional teeth used in FIG. 2(a). The arrangement of FIG. 2(a) on the other hand, works particularly well for low speed situations.

An example of the configuration of the signal-processing means 2 in this misfire detector is shown in FIG. 3. As shown in FIG. 3, the signal-processing means 2 comprises filters 21 and 22, and a judgment or decision means 23. These two filters 21 and 22 have the same sensitivity to a frequency of a misfire and different sensitivity to frequencies adjacent to that frequency.

Figure 4:
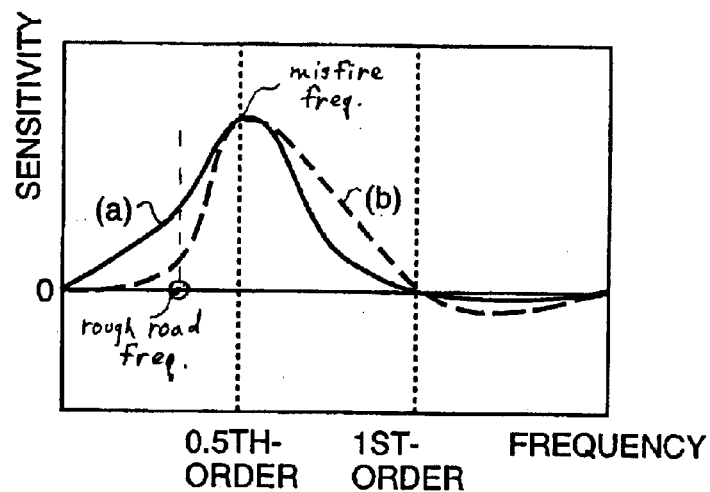
FIG. 4 shows an example of the frequency characteristics of the filters used for the signal-processing means.

FIG. 4 illustrates that the filters a and b both have the same sensitivity at the 0.5th order of crankshaft rotation frequency. On the other hand, as also shown in FIG. 4, the rough road noise frequency is at a different frequency at which the filters a and b do not have the same sensitivity.

Figure 5A:
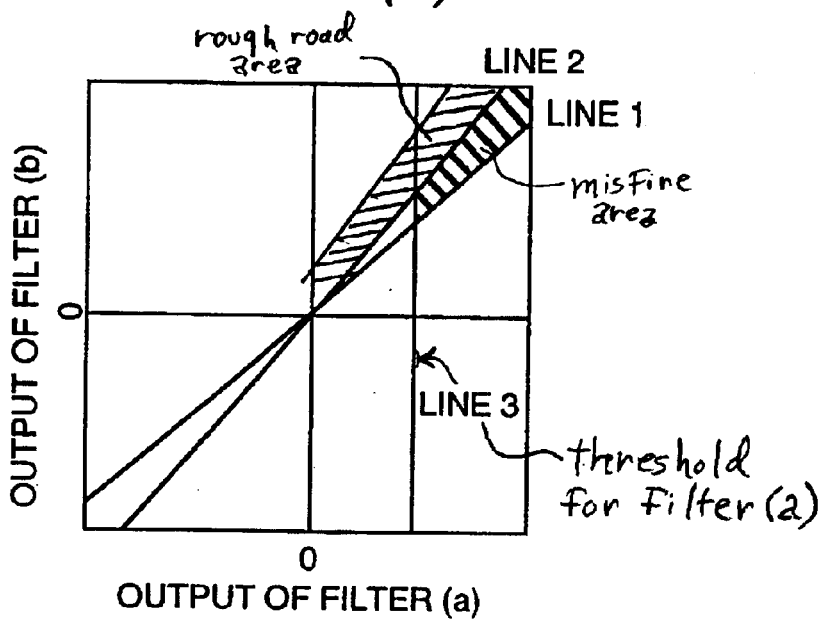
FIGS. 5(a) and 5(b) shows an example of a region in which the judgment means judges the occurrence of a misfire.

The judgment means 23 determines that a misfire has occurred when the ratio between the outputs of the two filters stays within a given range and one or both outputs of the two filters exceeds the required threshold values, as shown in FIG. 5(a).

Figure 5B:
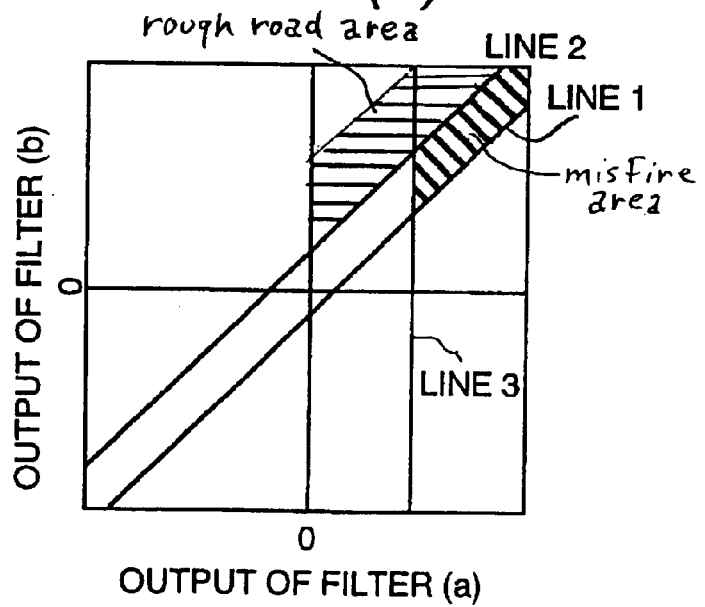

Specifically, in FIG. 5(a), lines 1 and 2 represent filter ratios while line 3 represents a threshold value for filter (a), for example. The threshold for line 3 is determined experimentally by determining the filter outputs of the filter (a) for both a case where a misfire occurs and a case where no misfire occurs. Incidentally, it should be noted that the filter outputs shown in FIG. 5(a) and 5(b) are in terms of time intervals (e.g., seconds). FIG. 5(a) shows an example as to how a misfire can be determined with the structure of FIG. 3 and the filter characteristics illustrated in FIG. 4. Specifically, as shown in FIG. 5(a), a misfire is determined to have occurred when the conditions are satisfied that the output of the filter (a) exceeds the threshold shown by line 3 and the difference between the outputs of the filter (a) and filter (b) is either approximately 0 or within the small range marked as "misfire area" in FIG. 5(a). FIG. 5(a) also shows an area marked "rough road area" which represents the outputs of the filters indicative of a rough road situation which would not satisfy these requirements. Thus, a misfire would not be indicated when the outputs of the filters fall within this "rough road area".

As an alternative, as shown in FIG. 5(b) the judgment means 23 can also determine that a misfire has occurred when the difference between the outputs of the two filters (a) and (b) stays within a given range shown in FIG. 5(b) and the output of the filter (a) or (b) exceeds the threshold shown by line 3.

Figure 6A:
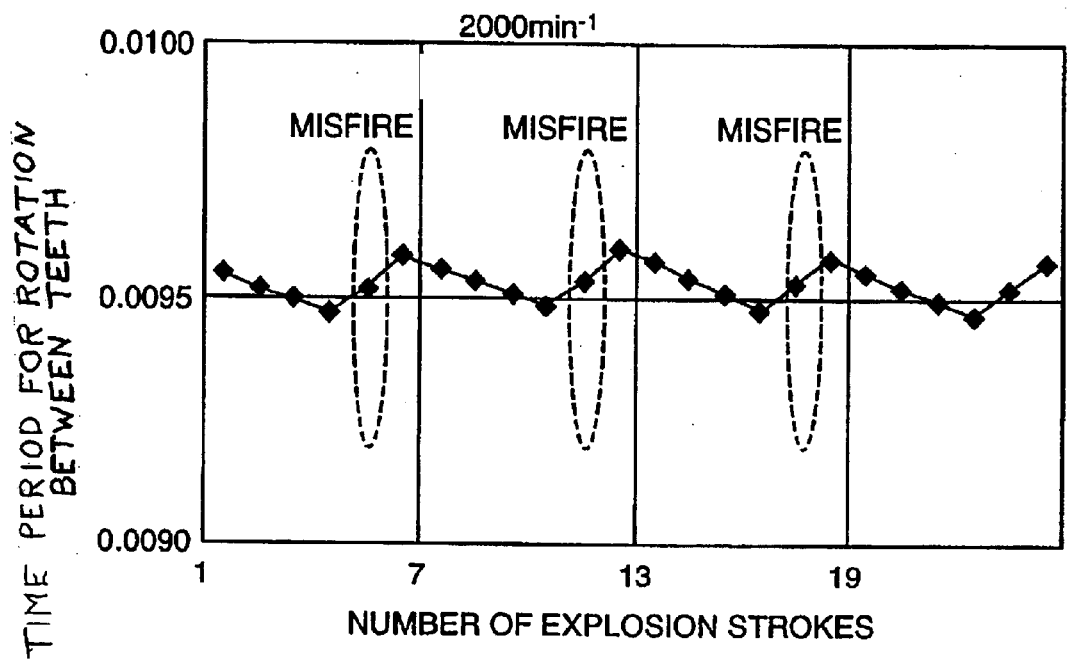
FIGS. 6(a) and 6(b) show an example of the time required for revolution that corresponds to misfiring.
Figure 6B:
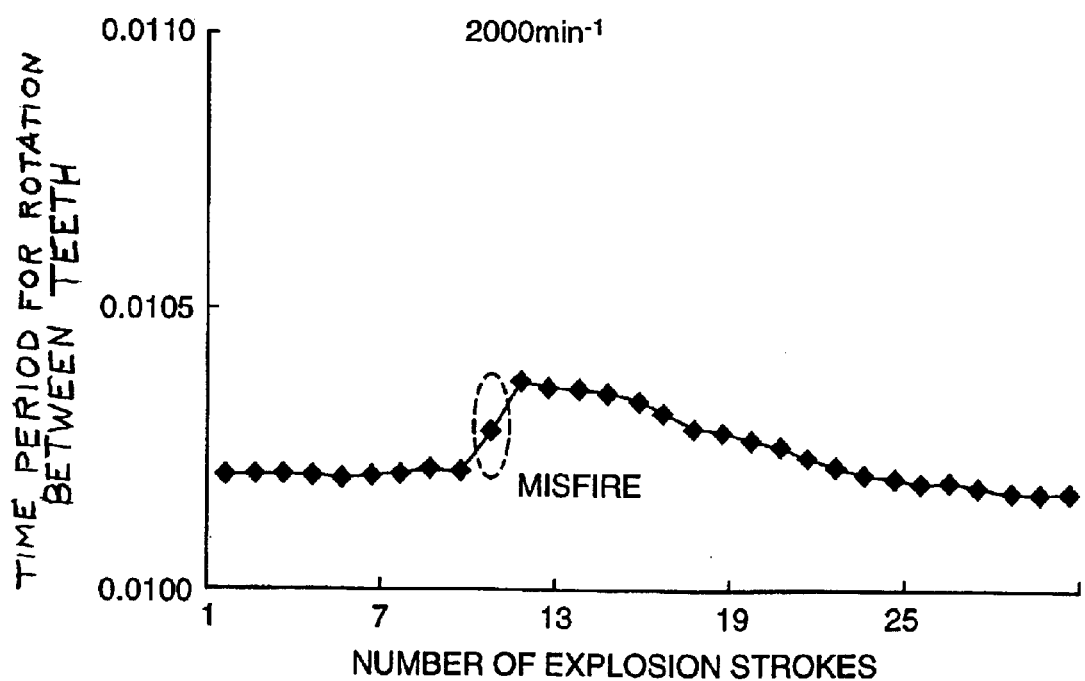
Figure 7:
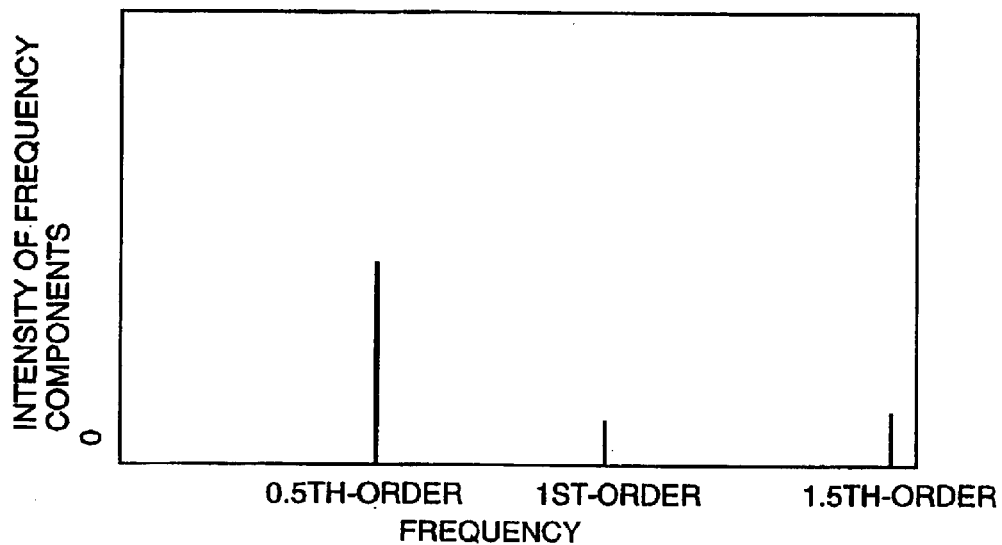
FIG. 7 shows the intensity of the frequency components corresponding to the time required for revolution that corresponds to misfiring.

FIGS. 6(a) and 6(b) show the time period required for crankshaft revolution between the teeth of such ring gears 11 as shown in FIG. 2(a) and 2(b) when a misfire occurs. FIG. 6(a) represents the time period required for crankshaft revolution in a case where a cylinder misfires every cycle, and FIG. 6(b) represents the time period required for crankshaft revolution that applies in a case of intermittent misfiring in which a cylinder misfires once for several cycles. The frequency distribution of the time period represented in FIG. 6(a) is shown in FIG. 7. In this figure, the nth-order frequency means "n" times the frequency of the crankshaft revolution. FIG. 7 illustrates a case in which continuous misfiring of one cylinder occurs during every cycle. In this case, the 0.5th-order components are great, as shown in FIG. 7. Therefore, when the time period required for revolution is entered into a filter which extracts only the 0.5th-order components, if the output of the filter exceeds a given threshold, this indicates that a misfire has occurred.

Figure 8:
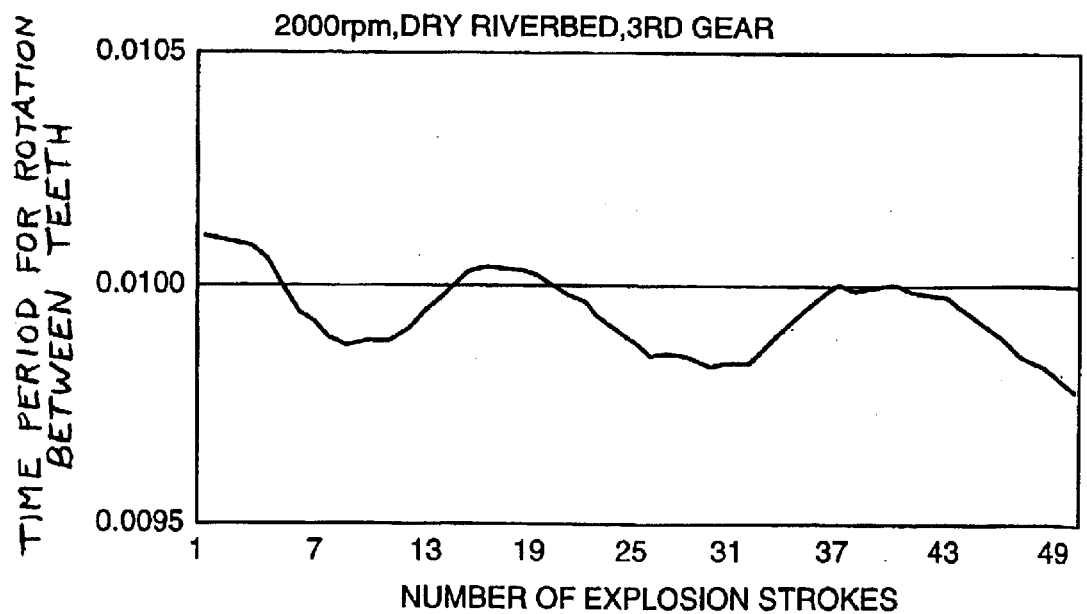
FIG. 8 shows an example of the time required for revolution that corresponds to driving on a rough road.

FIG. 8 shows an example of the time period required for revolution in a case that the vehicle is driving on a rough road such as a graveled road based on the output of the magnetic sensor 12 of FIG. 1. On a smooth road, this output would be steady, but as shown in FIG. 8, on a rough road the output varies substantially.

Figure 9:
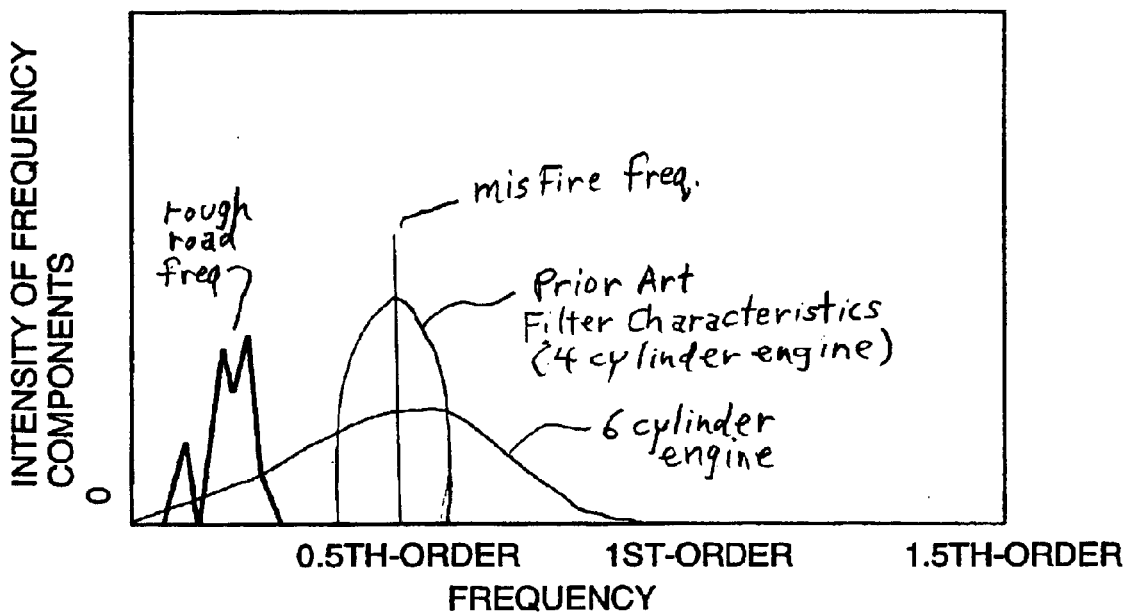
FIG. 9 shows the intensity of the frequency components corresponding to the time required for 10 revolution that corresponds to driving on a rough road.

FIG. 9 shows a frequency in the case shown in FIG. 8. FIG. 9 suggests that the components of the time period required for noise generated from driving on a rough road are mainly distributed between the 0th-order and the 0.5th-order components.

More specifically, FIG. 9 shows the rough road frequency distribution on the left side of the figure, compared with the misfire frequency at the 0.5th-order (similar to the misfire analysis shown in FIG. 7). In the present invention, an important feature is recognizing the differences in intensity of the frequency components for noise such as a rough road shown in FIG. 9 and the intensity components for a true misfire, as also shown in FIGS. 7 and 9.

For purposes of comparison, FIG. 9 also shows an example of a prior art characteristic for a four cylinder engine and a six cylinder engine. As can be appreciated from these characteristics, the prior art detectors such as used in Reference 1 discussed previously do not have a significant problem in accurately recognizing a misfire, even in the case of a traveling over rough road, because the filter characteristics will discriminate a misfire frequency from a rough road noise frequency in a case of a 4 cylinder engine. However, in a case of a 6 cylinder engine, the characteristics are different and will not permit distinguishing a misfire frequency from a rough road frequency in a prior art arrangement.

To detect only a misfire without suffering any effects of the rough road, therefore, the filter must extract only the 0.5th-order frequency components. It is difficult, however, to realize a filter capable of extracting only the 0.5th-order frequency components, and as shown in FIG. 4(a) and FIG. 9 the sensitivity of the filter spreads widely to both sides of the 0.5th-order frequency, particularly for a 6 cylinder engine.

It is thought that the filter sensitivity of both sides of the 0.5th-order frequency can be decreased enough to realize accurate misfire detection. However, Applicants have determined that when the number of the cylinders in the engine is large, the filter sensitivity of both sides cannot be decreased enough and the accuracy of misfire detection is insufficient, as can be appreciated from FIG. 9.

For these reasons, the present invention is based on the concept that the filter characteristics corresponding to the desired frequency components must be effectively detected.

Since the frequency distribution for a misfire has its peak at the 0.5th-order, if the time periods of misfire are input to the two filters shown in FIG. 4, the output of the filters are substantially the same. However, when the time periods of driving on a rough road are input to the filters, the output of the filter (a) is greater than the output of the filter (b) at the rough road frequency because the frequency of the time periods of driving on rough road is distributed between the 0th-order frequency and the 0.5th-order frequency. Therefore, accurate misfire detection, even on a rough road, can be realized by the following procedure:

If the output ratio between the two filters is close to 1, the judgment means decides that a misfire occurs; or If the output ratio is not close to 1, the judgment means of FIG. 3 decides that a misfire does not occur and the magnitude of the filter output is caused by noise; such as rough road noise.

Another way for accurately detecting misfires is to calculate the difference, instead of the ratio, between the output of the two filters. Then if the differences is close to 0, the decision means decides that a misfire has occurred, and if the difference is not close to 0, the decision means decides that no misfire occurred and the magnitude of the filter output is due to noise, such as rough-road noise.

Therefore, in signal processing means 2 shown in FIG. 3, accurate misfire detection, when in the face of noise, such as rough road noise, is processed in the following manner. First, the time periods from the revolution detection means 1 are input to the filters 21, 22, which have the same sensitivity to the frequency of the time period wave of misfire and different sensitivities to the adjacent frequencies to the said misfire frequency. The judgment or decision means 23 then performs misfire detection when the ratio between the outputs of the said filters 21, 22 is within a given range. The decision means decides that a misfire occurs when the output of one of the filters 21, 22 exceeds a threshold or when the output of both of the filters 21, 22 exceeds the threshold. Incidentally, the sensitivities of the two filters in FIG. 4 to a misfire do not have to be strictly the same and differences between the sensitivities is allowed to some extent.

Second Embodiment

As was the case in the first embodiment shown in FIG. 1, the misfire detector in the second embodiment can be broadly divided into two parts: a revolution detection means 1 for measuring the time period required for the crankshaft of an internal-combustion engine to revolve for a given angle; and a signal-processing means 2 for detecting misfires of the internal-combustion engine by processing the time period determined by the revolution detection means. The configuration of the signal-processing means 2 is the same as that shown in FIG. 3 for the first embodiment. However, the filter characteristics for the filters 21 and 23 will be as shown in FIG. 10.

A misfire detector that accurately detects misfires without being adversely affected by the roughness of a road surface can likewise be realized by the second embodiment as follows. Instead of using two filters that have the same sensitivity to the frequency resulting from a misfire and different sensitivities to frequencies adjacent to that frequency, (as shown in FIG. 4), the second embodiment uses one filter similar to filter (a) of FIG. 4 and another filter (b) whose sensitivity to the frequency components generated by misfiring is 0 and whose sensitivity to frequency components adjacent to the above frequency components is not 0. With this arrangement it can be decided that a misfire has occurred only if the output of this filter (b) stays within a given range. An example of this is shown by line (b) in FIG. 10.

Figure 10:
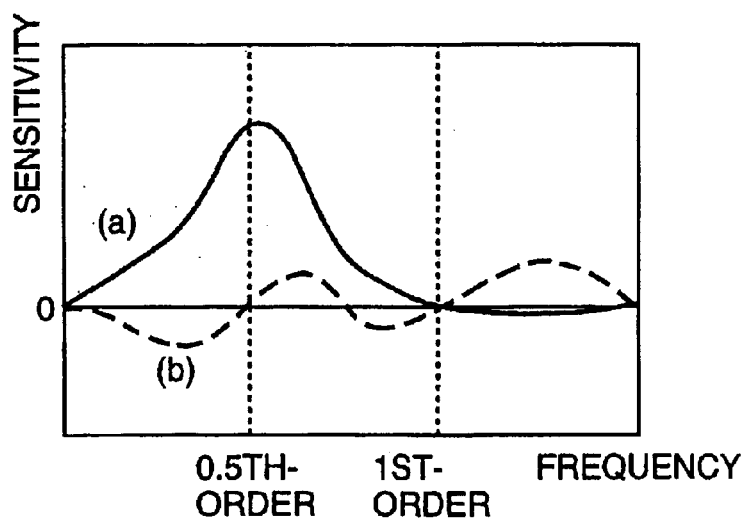
FIG. 10 shows another example of the frequency characteristics of the filters used for the signal-processing means.

More specifically, as shown in line (b) of FIG. 10, when the filter sensitivity to the 0.5th-order frequency components generated by misfiring is 0 and the filter sensitivity to adjacent frequency components is not 0, the output of the filter for the input of misfire is 0. This is the case since the frequency components corresponding to the time period required for revolution of the crankshaft in the case that a misfire occurs are distributed principally at the 0.5th-order. That is to say, the output of the filter is not dependent on the amplitude of the signal takes a value of 0 for the input of misfire.

Figure 11:
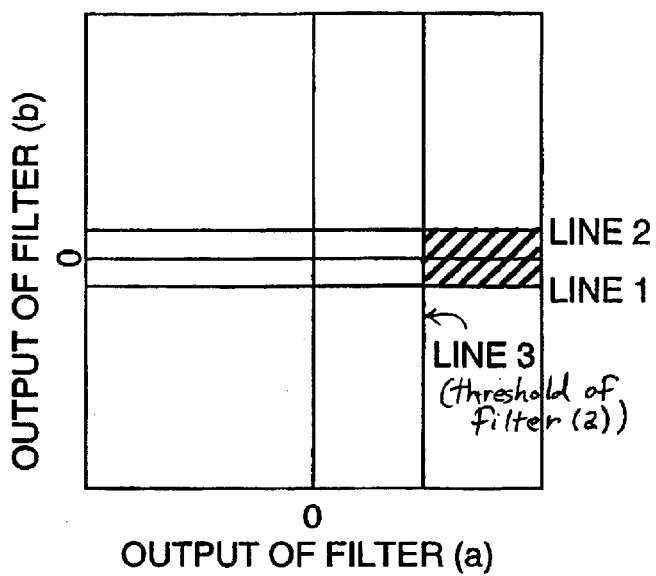
FIG. 11 shows another example of a region in which the judgment means judges the occurrence of a misfire.

During driving on a rough road, however, the output of the filter (b) takes a value other than 0, since the frequency components corresponding to the time period required for crankshaft revolution are distributed between the 0th-order and the 0.5th-order. Therefore, a decision that a misfire has occurred will only be made if the output of the filter stays within a given range close to 0. As shown in line (a) of FIG. 10, if the output of the filter whose sensitivity peaks at the 0.5th-order components exceeds the threshold, a misfire will be judged to have occurred. An example of a region in which a misfire is determined to have occurred is shown in FIG. 11.

In this way, misfire detection which is accurate even in the event of disturbances due to causes such as driving on a rough road, can be implemented with the second embodiment.

Third Embodiment

As was the case in the first embodiment shown in FIG. 1, the misfire detector in the third embodiment can be broadly divided into two parts: a revolution detection means 1 for measuring the time period required for the crankshaft of an internal-combustion engine to revolve for a given angle; and a signal-processing means 2 for detecting misfires of the internal-combustion engine by processing the time period determined by the revolution detection means. In the third embodiment, the configuration of the signal-processing means 2 is the same as shown in FIG. 3 for the first embodiment. However, in the third embodiment, a different arrangement is provided for the two filters shown in FIG. 4 than the arrangement provided in the first embodiment.

Figure 12A:
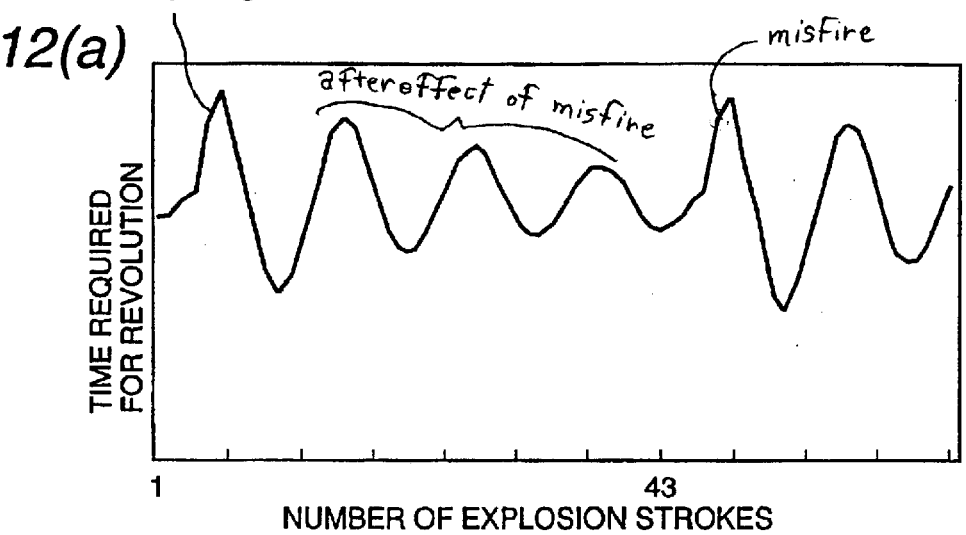
FIGS. 12(a) and 12(b) show an example of the time required for revolution that corresponds to the reverberation of misfiring.
Figure 12B:
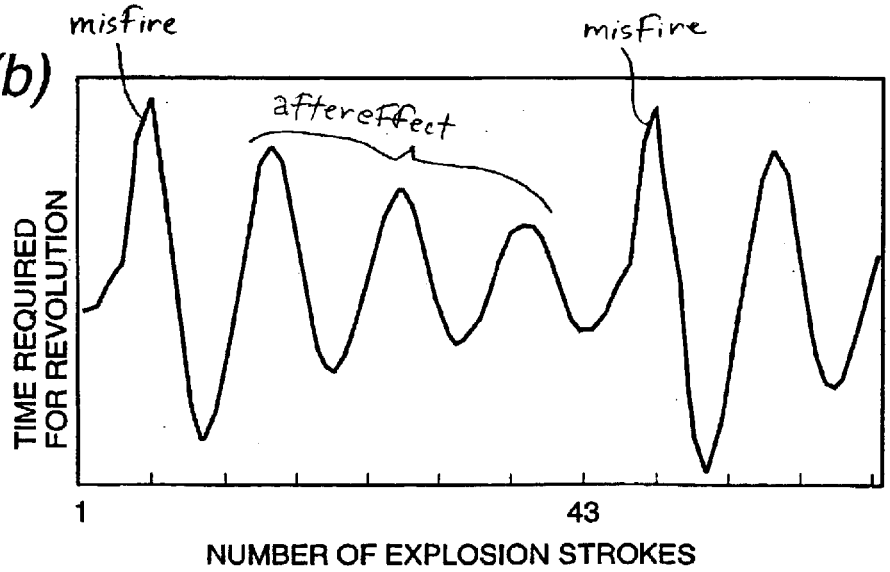
Figure 13A:
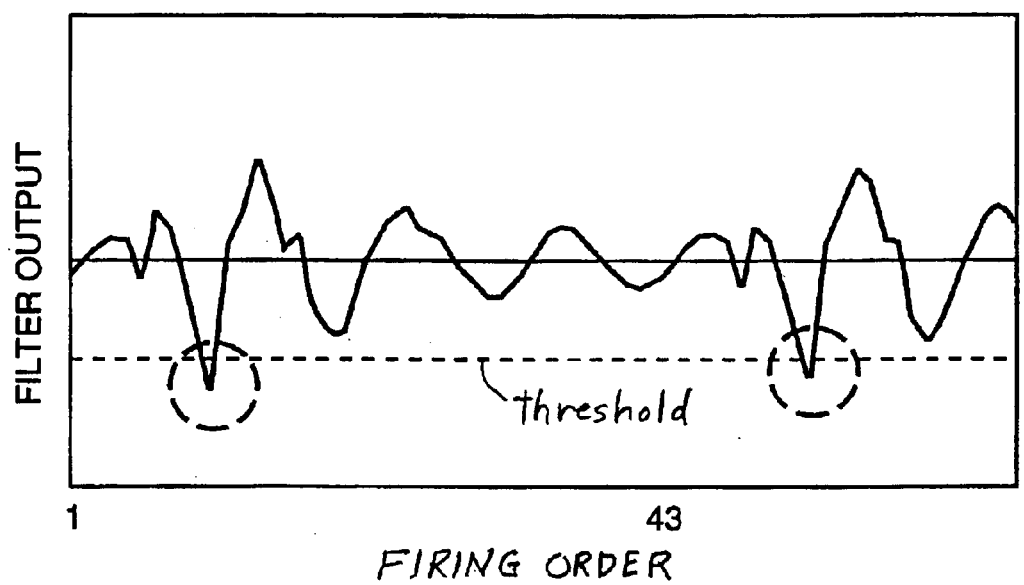
FIGS. 13(a) and 13(b) show an example of the filter outputs generated during the reverberation of misfiring.
Figure 13B:
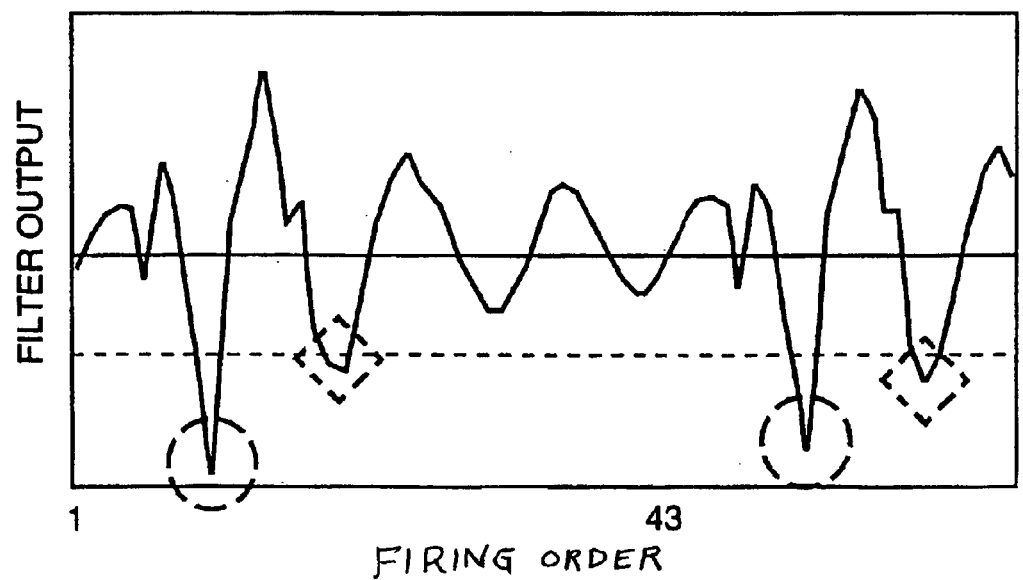
Figures 14, 15:
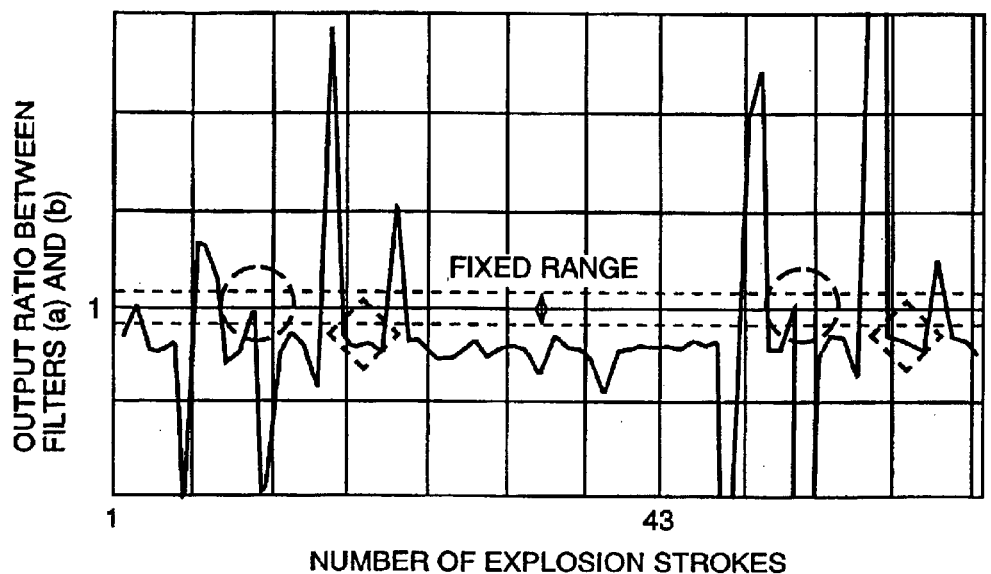
FIG. 14 shows an example of the filter output ratio existing during the reverberation of misfiring.
FIG. 15 is a block diagram of the signal-processing means pertaining to another embodiment of the present invention.

FIG. 12(a) shows an example of the time period required for crankshaft revolution in the case that misfiring causes the vehicle body to suffer jolting as an after effect. Even when vehicles of the same construction are running at the same engine speed and under the same engine load, the amplitude of the signal corresponding to the time period required for crankshaft revolution may almost double even though the waveform of the revolving time period requirement remains the same, as shown in FIG. 12(b). The output of the filter (a) shown by line (a) in FIG. 4 in such a case takes such a form as shown in FIG. 13(a) or 13(b). If a determination of a misfire with the same threshold value is undertaken with respect to the status in FIG. 13(a) and FIG. 13(b), it is possible that the sections enclosed in a round dotted line in FIG. 13(a) can be correctly recognized as the signal waveform indicating that a misfire has occurred. If the same threshold is applied in the case of FIG. 13(b), in addition to the sections enclosed in a round dotted line, the sections enclosed in a rhomboid dotted line may incorrectly be recognized as an indication that a misfire may have occurred. In order to recognize only the round sections as the signal waveform correctly indicating that a misfire has occurred, the present inventors considered, for example, a filter that outputs the ratio between the filters 21 and 22 of FIG. 4. The output of the filter which outputs this ratio is shown in FIG. 14. In FIG. 14, correct misfire detection can be conducted by recognizing that a misfire has occurred only if the output of the filter stays within a given range and the output of the filter in line (a) of FIG. 4 exceeds the threshold value. At this time, as shown in FIG. 14, the filter that outputs the ratio between the filters 21 and 22 of FIG. 4 is considered to be a filter that outputs the difference between the frequency of the input signal and the frequency of a misfire, without depending on the amplitude of the input to the above filter. Also, the filter shown for line (a) in FIG. 4 is considered to be a filter that outputs the amplitude of the input to that filter. In consideration of these factors, the two filters shown in FIG. 3 can be combined so that one filter 15 outputs an index indicating differences between the frequency of the input signal and the frequency of a misfire, and so that the other filter outputs the amplitude of the input to the above filter. Thereby, a combination of these outputs provides accurate misfire detection.

Instead of the ratio between the outputs of the filters 21 and 22 in FIG. 4, the value of the filter(b) in FIG. 10 can be used as the index which indicates the difference between the frequency of the input signal to the filter and the frequency of a misfire. Independently of input amplitude, a value close to 0 is also output from this filter when the frequency of the input signal is close to the frequency of a misfire.

A misfire detector for determining whether a misfire has occurred has been described for the first to third embodiments of the present invention. An expanded version of this misfire detector, that is to say, a misfire detector capable of identifying the misfiring cylinder is described as a fourth embodiment below.

Fourth Embodiment

As was the case for the embodiment of FIG. 1, the misfire detector in the fourth embodiment can be broadly divided into two parts: a revolution detection means 1 for measuring the time period required for the crankshaft of an internal-combustion engine to revolve for a given angle; and a signal-processing means 2 for detecting the misfiring of the internal-combustion engine by processing the time period detecting the revolution detection means.

An example of the configuration of the signal-processing means 2 in this misfire detector of the fourth embodiment is shown in FIG. 15. The signal-processing means 2, in addition to having components shown in FIG. 3, comprises an output memory 24 into which several past outputs of either of said two filters are stored, a data size comparison means 25 for comparing magnitude between the values which have been stored into the output memory 24, and a misfiring-cylinder identification means 26. The misfiring cylinder identification means operates such that, after the required judgment means 23 has determined that a misfire has occurred, of all cylinders which have had expansion stroke when a specific relationship in magnitude between the stored values is satisfied, only the cylinder that has experienced a fixed number of expansion strokes within a fixed time is identified as the misfiring cylinder.

The outputs of the filters have signal waveforms such as shown in FIGS. 13(a) and FIG. 13(b) The interval from the explosion cylinders with expansion strokes existing with extremal values which have been identified as misfiring signal values, to any actual misfiring cylinders, is a fixed number of expansion strokes. This interval is determined by the characteristics of the filters. Therefore, several past outputs of the filters are stored into the output memory 24, and, after the stored values have been compared in terms of magnitude by the data size comparison means 25 and the explosion cylinders existing when the filter outputs take the required extremal values have been searched for, of all cylinders which have had expansion strokes when the filter outputs take the respective extremal values, only the cylinder that has experienced a fixed number of expansion strokes is identified as the misfiring cylinder by the misfiring-cylinder identification means 26. In this way, a misfire detector capable of accurately detecting a misfire even in the case of noise, such as driving on a rough road, and identifying the misfiring cylinder, can be implemented.

It is also possible to identify the cylinder number for the misfiring cylinder based on the time between the actual misfire and the detection of this misfire by the filter output using a second ring gear 11' shown in FIG. 1. The magnetic sensor 12' only indicates each time the first cylinder fires whereas the magnetic sensor 12 shows when each cylinder fires, as discussed above. Therefore, it is possible to use the two ring gears 11 and 11' to determine when any individual cylinder fires. In this case, the output of the judgment means such as shown in FIG. 3 must be connected to the cylinder number counter 28, as shown in FIG. 3. Therefore, the judgment means 23 can then determine which cylinder is misfiring when it senses the 0.5th-order misfire frequency by also utilizing the information from the cylinder number counter 28.

Four embodiments have been described above. A method of verifying whether a certain misfire detector operates in accordance with the present invention is described below.

Figure 16:
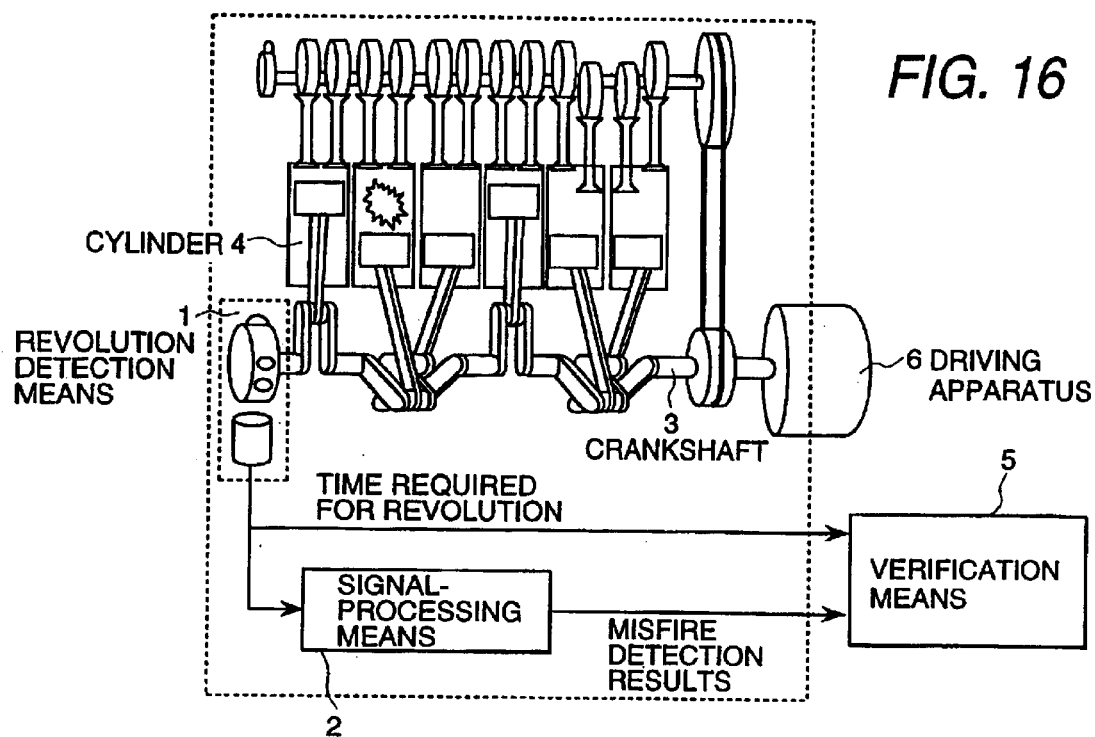
FIG. 16 is a connection diagram of the means for verifying the validity of the present invention.

As shown in FIG. 16, a verification means 5 is connected to a misfire detector including a revolution detection means 1 and a signal-processing means 2. A driving apparatus 6 is connected to the crankshaft 3 of the internal-combustion engine and creates various patterns of movements of the crankshaft 3. The misfire detection results output from the misfire detector under the varying combinations provided by the driving apparatus 6, and the time required for crankshaft revolution that is output from the revolution detection means 1 are analyzed to verify whether the misfire detector operates in accordance with the present invention.

Figure 17:
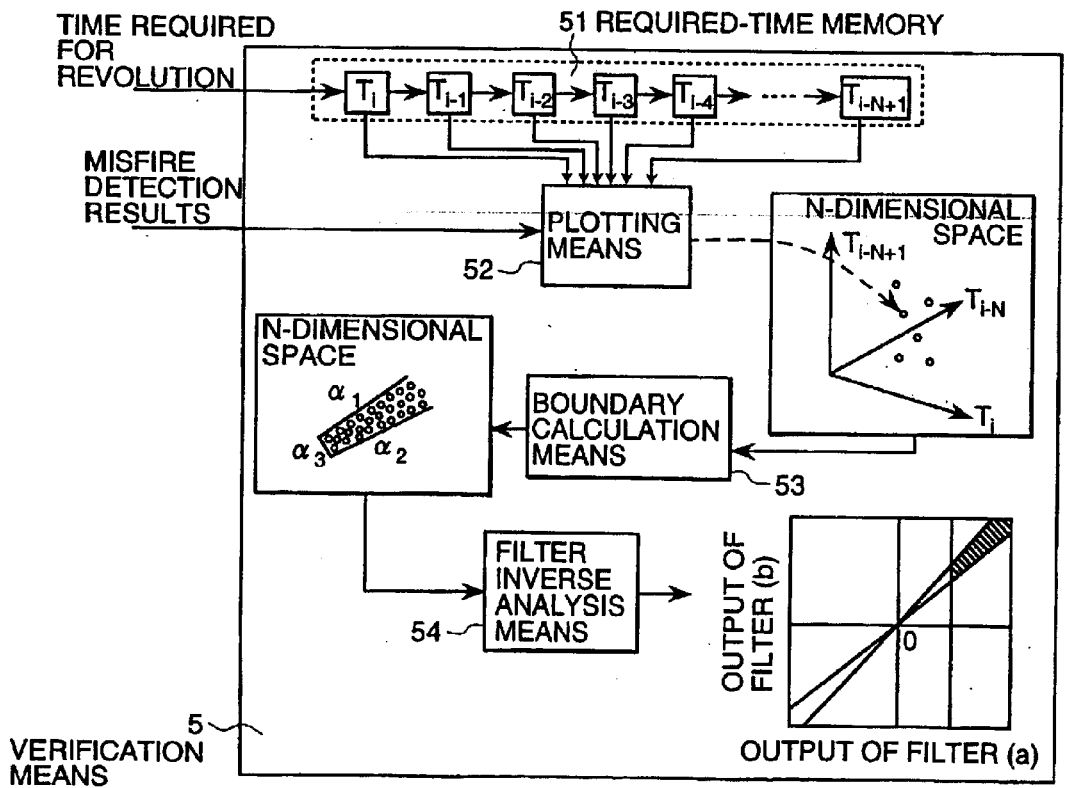
FIG. 17 is another connection diagram of the means for verifying the validity of the present invention.

The configuration of the verification means 5 is described below using FIG. 17. The verification means 5 comprises a required-time memory 51, by which N past explosions of data on the time period required for crankshaft revolution are stored, a plotting means 52, by which the vectors corresponding to the revolving time requirement which has been stored into the required-time memory 51 are plotted in an N-dimensional space, a boundary calculation means 53, which calculates the boundary in the vectorial distribution of the plotted revolving time requirement, and a filter inverse analysis means S4, which calculates the filter data that the misfire detector has used.

The value of N within the required-time memory 51 is equivalent to the length of filtering. If the filtering length is unknown, this value can be set to the maximum assumable filtering length. Or N can be set to a value slightly smaller than the maximum assumable filtering length. In the latter, if it is verified that the misfire detector operates in accordance with the present invention, no further verification is required. On the other hand, if the misfire detector does not operate in accordance with the invention, the value of N is increased and re-verification is carried out. If this process is repeated and N exceeds a common-sense filtering range as a result, it can be judged that the misfire detector does not operate in accordance with the present invention.

If the current time required for crankshaft revolution and the time required for crankshaft revolution existing before one explosion stroke occurs are taken as $T_i$ and $T_{i-i}$, respectively, the vectors of a revolving time requirement equivalent to N past explosions from the present time are already stored into the required-time memory 51, as shown below:

Formula 1

$$(T_i, T_{i-1}, \ldots, T_{i-N+1}) \quad \text{(Formula 1)}$$

If the misfire detection results output from the misfire detector indicate a misfire, the vectors corresponding to the revolving time requirement which has been stored into the required-time memory 51 are plotted in an N-dimensional space by the plotting means 52. The distribution of the time period required for crankshaft revolution can be created in the N-dimensional space by repeating the above process for various revolution patterns of the crankshaft 3.

The boundary calculation means 53 calculates the boundary in the vectorial distribution of the vectors of the misfiring revolving time requirement that have been created in the N-dimensional space. More specific algorithms are known as a method of calculating convex closure, and they are described in, for example, "Computational Geometry" (authors: Preparata, F P. and Shamos, M. I., publisher: Springer-Verlag, 1985). If the misfire detector operates in accordance with the present invention, the boundary consists of three planes. Related equations are collectively shown as follows:

$$\begin{cases} \alpha_1: f * T \equiv f_0 T_i + f_1 T_{i-1} + f_2 T_{i-2} + \ldots + f_{N-1} T_{i-N+1} > 0 & \text{(Formula 2)} \\ \alpha_2: g * T \equiv g_0 T_i + g_1 T_{i-1} + g_2 T_{i-2} + \ldots + g_{N-1} T_{i-N+1} > 0 \\ \alpha_3: h * T \equiv h_0 T_i + h_1 T_{i-1} + h_2 T_{i-2} + \ldots + h_{N-1} T_{i-N+1} > k_3 \end{cases}$$

At the filter inverse analysis means 54, the filter that has been used for the misfire detection is calculated from that boundary in the vectorial distribution of the misfiring revolving time requirement that has been derived by the boundary calculation means as follows.

$$\begin{cases} f = a + b \\ g = b + a \end{cases} \quad \text{(Formula 3)}$$

When formula 2 is converted in this way, the equations "$\alpha 1$" and "$\alpha 2$" relating to the boundary can be rewritten as follows:

$$\begin{cases} -1 < a/b < 1 \\ b > 0 \end{cases} \quad \text{(Formula 4)}$$

Formula 4 is further rewritten as follows using a very small value of "$\delta > 0$":

$$\begin{cases} 1 - \delta < (b + \delta a)/b < 1 + \delta \\ b > 0 \end{cases} \quad \text{(Formula 5)}$$

Hence, it can be seen that, when the ratio between the outputs of the two filters, "$b+\delta a$" and "$b$", stays within a fixed range close to 1, the misfire detector judges that a misfire has occurred.

In order for a misfire detector to operate in accordance with the invention such as shown in FIG. 4, the "b+δa" and "b" filters must have substantially the same characteristics at the frequency resulting from misfiring. Once such matching in frequency characteristics has been proven, it can be determined that the misfire detector operates in accordance with the present invention.

The use of a misfire detector having one of the configurations described above makes it possible to achieve misfire detection that is accurate even in the case of disturbances due to causes such as driving on a rough road. The cylinder where a misfire is occurring can also be identified, as described above. Once a misfire has been detected, it is possible not only to avoid driving under a status unfavorable in terms of fuel consumption, but also to avoid the emission of unburnt gases and to minimize adverse effects on the environment, by stopping operation or conducting repairs.

The invention may be embodied in other specific forms without departing from the spirit or essential characteristic thereof. The present embodiments are therefore to be considered in all respects as illustrative and not restrictive.

What is claimed is:

1. A misfire detector comprising:

a revolution detection means for measuring a time period required for a crankshaft of an internal-combustion engine to revolve for a given angle, and a signal-processing means for detecting misfiring of the internal-combustion engine by processing the time period, wherein said signal-processing means comprises:

two filters having the same sensitivity to a frequency resulting from misfiring, and differing in the sensitivity to frequencies adjacent to said frequency, and a judgment means for judging that a misfire has occurred when a ratio or difference between outputs of the two filters stays within a fixed range and one or both of the two filters have respective outputs exceeding a threshold value.

2. A misfire detector comprising:

a revolution detection means for measuring a time period required for a crankshaft of an internal-combustion engine to revolve for a given angle, and a signal-processing means for detecting misfiring of the internal-combustion engine by processing the time period, wherein the signal-processing means comprises:

a first filter whose sensitivity to frequency components resulting from misfiring is 0 and whose sensitivity to frequencies adjacent to said corresponding frequency component is not 0, a second filter having its maximum sensitivity to the frequency components resulting from misfiring, and a judgment means for judging that a misfire has occurred when an output of the first filter stays within a fixed range and an output of the second filter exceeds a threshold.

3. A misfire detector comprising:

a revolution detection means for measuring a time period required for a crankshaft of an internal-combustion engine to revolve for a given angle, and a signal-processing means for detecting misfiring of the internal-combustion engine by processing the time period, wherein said signal-processing means comprises:

a first filter which outputs an index indicating how close an input signal to the filter is with respect to a frequency resulting from misfiring, a second filter which outputs an amplitude of its input signal, and a judgment means for judging that a misfire has occurred if an output of the first filter stays within a fixed range and an output of the second filter exceeds a threshold.

4. A misfire detector comprising:

a revolution detection means for measuring a time period required for a crankshaft of an internal-combustion engine to revolve for a given angle, and a signal-processing means for detecting misfiring of the internal-combustion engine by processing the time period, wherein said signal-processing means comprises:

two filters having the same sensitivity to a frequency resulting from misfiring, and differing in the sensitivity to frequencies adjacent to said frequency, and a judgment means for judging that a misfire has occurred when a ratio or difference between outputs of the two filters stays within a fixed range and one or both of the two filters have respective outputs exceeding a threshold value, wherein said signal-processing means further comprises:

an output memory into which several past outputs of either of said first and second filters are stored, a data size comparison means for comparing magnitude between values which have been stored into said output memory, and a misfiring-cylinder identification means by which, after the judgment means has judged that a misfire is occurring, of all explosion cylinders existing when a specific relationship in magnitude between said values is satisfied, only a cylinder that has experienced a fixed number of explosion strokes within a fixed time is identified as the misfiring cylinder.

5. A misfire detector comprising:

a revolution detection means for measuring a time period required for a crankshaft of an internal-combustion engine to revolve for a given angle, and a signal-processing means for detecting misfiring of the internal-combustion engine by processing the time period, wherein said signal-processing means comprises:

a first filter whose sensitivity to frequency components resulting from misfiring is 0 and whose sensitivity to frequencies adjacent to said corresponding frequency component is not 0, a second filter having its maximum sensitivity to the frequency components resulting from misfiring, and a judgment means for judging that a misfire has occurred when an output of the first filter stays within a fixed range and an output of the second filter exceeds a threshold, wherein said signal-processing means further comprises:

an output memory into which several past outputs of either of said first and second filters are stored, a data size comparison means for comparing magnitude between values which have been stored into said output memory, and a misfiring-cylinder identification means by which, after the judgment means has judged that a misfire is occurring, of all explosion cylinders existing when a specific relationship in magnitude between said values is satisfied, only a cylinder that has experienced a fixed number of explosion strokes within a fixed time is identified as the misfiring cylinder.

6. A misfire detector comprising:

a revolution detection means for measuring a time period required for a crankshaft of an internal-combustion engine to revolve for a given angle, and a signal-processing means for detecting misfiring of the internal-combustion engine by processing the time period, wherein said signal-processing means comprises:

a first filter which outputs an index indicating how close an input signal to the filter is with respect to a frequency resulting from misfiring, a second filter which outputs an amplitude of its input signal, and a judgment means for judging that a misfire has occurred if an output of the first filter stays within a fixed range and an output of the second filter exceeds a threshold, wherein said signal-processing means further comprises:

an output memory into which several past outputs of either of said first and second filters are stored, a data size comparison means for comparing magnitude between values which have been stored into said output memory, and a misfiring-cylinder identification means by which, after the judgment means has judged that a misfire is occurring, of all explosion cylinders existing when a specific relationship in magnitude between said values is satisfied, only a cylinder that has experienced a fixed number of explosion strokes within a fixed time is identified as the misfiring cylinder.

7. A misfire detector comprising:

a revolution detector to measure a time period required for a crankshaft of an internal-combustion engine to revolve for a given angle, and a signal-processor to detect misfiring of the internal-combustion engine by processing the time period, wherein said signal-processing comprises:

two filters having the same sensitivity to a frequency resulting from misfiring, and differing in the sensitivity to frequencies adjacent to said frequency, and a judgment circuit to judge that a misfire has occurred when a ratio or difference between outputs of the two filters stays within a fixed range and one or both of the two filters have respective outputs exceeding a threshold.

8. A misfire detector comprising:

a revolution detector to measure a time period required for a crankshaft of an internal-combustion engine to revolve for a given angle, and a signal-processor to detect misfiring of the internal-combustion engine by processing the time period, wherein said signal-processor comprises:

two filters having the same sensitivity to a frequency resulting from misfiring, and differing in the sensitivity to frequencies adjacent to said frequency, and a judgment circuit to judge that a misfire has occurred based on analyzing outputs of the two filters.

9. A misfire detector comprising:

a revolution detector to measure a time period required for a crankshaft of an internal-combustion engine to revolve for a given angle, and a single-processor to detect misfiring of the internal-combustion engine by processing the time period, wherein said signal-processor comprises:

a first filter whose sensitivity to frequency components resulting from misfiring is 0 and whose sensitivity to frequencies adjacent to said frequency components is not 0, a second filter having its maximum sensitivity with respect to the frequency components resulting from misfiring, and a judgment circuit to judge that a misfire has occurred based on an analysis of outputs of the first filter and second filters.

10. A misfire detector comprising:

a revolution detector to measure a time required for a crankshaft of an internal-combustion engine to revolve for a given angle, and a signal-processor to detect the misfiring of the internal-combustion engine by processing the time period, wherein said signal-processor comprises:

a first filter which outputs an index indicating how close an input signal to the filter is with respect to a frequency resulting from misfiring, a second filter which outputs an amplitude of its input signal, and a judgment circuit to judge that a misfire has occurred based on analysis of the index and the amplitude from the first and second filters.

* * * * *